US009531968B2

(12) United States Patent
Boorom (10) Patent No.: US 9,531,968 B2
(45) Date of Patent: Dec. 27, 2016

(54) IMAGERS HAVING IMAGE PROCESSING CIRCUITRY WITH ERROR DETECTION CAPABILITIES (71) Applicant: Semiconductor Components Industries, LLC, Phoenix, AZ (US)

(72) Inventor: Kenneth Fiske Boorom, Corvallis, OR (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 91 days.

(21) Appl. No.: 14/189,939

(22) Filed: Feb. 25, 2014

(65) Prior Publication Data
US 2015/0244948 A1  Aug. 27, 2015

(51) Int. Cl.
*H04N 5/217* (2011.01)
*H04N 5/357* (2011.01)
*H04N 5/374* (2011.01)

(52) U.S. Cl.
CPC .............. *H04N 5/357* (2013.01); *H04N 5/374* (2013.01)

(58) Field of Classification Search
CPC ...................................... H04N 5/357
USPC .......................................................... 348/241
See application file for complete search history.

(56) References Cited

U.S. PATENT DOCUMENTS

| | | | |
|---|---|---|---|
| 5,617,484 A * | 4/1997 | Wada | G06K 9/38 382/156 |
| 6,633,335 B1 | 10/2003 | Kwon et al. | |
| 7,667,751 B2 | 2/2010 | Fraenkel et al. | |
| 2002/0141496 A1* | 10/2002 | Yang | 375/240.2 |
| 2004/0252193 A1* | 12/2004 | Higgins | G08G 1/0175 348/149 |
| 2006/0208289 A1* | 9/2006 | Ohkawa et al. | 257/291 |
| 2007/0109879 A1* | 5/2007 | Mabuchi | 365/190 |
| 2008/0129732 A1* | 6/2008 | Johnson | G06T 7/0002 345/424 |
| 2008/0290399 A1* | 11/2008 | Levy et al. | 257/324 |
| 2009/0101798 A1* | 4/2009 | Yadid-Pecht | H04N 5/3532 250/208.1 |
| 2010/0169292 A1* | 7/2010 | Radhakrishnan | G06F 17/30781 707/706 |
| 2011/0297838 A1* | 12/2011 | Wangerin | G01T 1/2928 250/370.09 |
| 2012/0106808 A1* | 5/2012 | Morioka et al. | 382/125 |
| 2013/0265066 A1 | 10/2013 | Hsieh et al. | |

(Continued)

*Primary Examiner* — Usman Khan
(74) *Attorney, Agent, or Firm* — Treyz Law Group, P.C.; Vinnet Dixit (57) ABSTRACT Image processing circuitry may be used to detect imaging errors of a pixel array, including imaging errors that would otherwise be difficult to detect visually. The image processing circuitry may identify a subset of the pixels that are characterized by burst noise such as RTS noise. The image processing circuitry may monitor the identified subset of the pixels to detect imaging errors. The circuitry may maintain histograms of image values for the subset of pixels from previously captured images. The image processing circuitry may update the histograms using each new captured image and determine whether the updated histograms have tri-modal distributions. In response to determining that the updated histograms do not have tri-modal distributions of values, the circuitry may identify that an imaging error has occurred. If desired, expected differences in dark current across multiple exposure settings may be used to help identify imaging errors.

20 Claims, 7 Drawing Sheets (56) References Cited

U.S. PATENT DOCUMENTS

2014/0313350 A1* 10/2014 Keelan .......................... 348/188

* cited by examiner

IMAGERS HAVING IMAGE PROCESSING CIRCUITRY WITH ERROR DETECTION CAPABILITIES

BACKGROUND

This relates generally to imaging systems, and more particularly to imaging systems for error-sensitive applications such as automotive applications.

Modern electronic devices such as cellular telephones, cameras, and computers often use digital image sensors. Imagers (i.e., image sensors) may be formed from a two-dimensional array of image sensing pixels. Each pixel receives incident photons (light) and converts the photons into electrical signals. Image sensors are sometimes designed to provide images to electronic devices using a Joint Photographic Experts Group (JPEG) format.

In a system that incorporates image sensors, data from the sensors typically flows through multiple electronic subsystems, which may either be co-located on the image sensor, or external to the sensor. Such systems can fail spontaneously in the field due to effects such as electromigration or cosmic radiation. Imaging systems that are used in error-sensitive applications such as advanced driver assistance systems (ADAS) or self-driving cars have limited tolerance for incorrect operation, and current automotive safety standards, such as ISO-26262, mandate that systems include the capability to detect failures that could create hazardous situations. Consider the scenario in which image data from an image sensor is used to control an adaptive cruise control function or automatic braking function. In this scenario, incorrect image data from the image sensor that does not accurately reflect reality can be a safety hazard (e.g., malfunction of the adaptive cruise control or automatic braking).

DETAILED DESCRIPTION

Imaging systems having digital image sensor modules are widely used in electronic devices such as digital cameras, computers, cellular telephones, and other electronic devices. A digital image sensor module may include one or more image sensors that gather incoming light to capture an image.

In some situations, imaging systems may form a portion of a larger system such as a surveillance system or a safety system for a vehicle (e.g., an automobile, a bus, or any other vehicle). In a vehicle safety system, images captured by the imaging system may be used by the vehicle safety system to determine environmental conditions surrounding the vehicle. As examples, vehicle safety systems may include systems such as a parking assistance system, an automatic or semi-automatic cruise control system, an auto-braking system, a collision avoidance system, a lane keeping system (sometimes referred to as a lane drift avoidance system), etc. In at least some instances, an imaging system may form part of a semi-autonomous or autonomous self-driving vehicle. Such imaging systems may capture images and detect nearby vehicles using those images. If a nearby vehicle is detected in an image, the vehicle safety system may sometimes operate a warning light, a warning alarm, or may operate active braking, active steering, or other active collision avoidance measures. A vehicle safety system may use continuously captured images from an imaging system having a digital image sensor module to help avoid collisions with objects (e.g., other automobiles or other environmental objects), to help avoid unintended drifting (e.g., crossing lane markers) or to otherwise assist in the safe operation of a vehicle during any normal operation mode of the vehicle.

Vehicle safety standards may require that the proper operation of any component of a vehicle safety system (including imaging system components) be verified before, during, and/or after operation of the vehicle. Verification operations for imaging system components may be performed by an imaging system prior to and/or after operation of a vehicle (e.g., upon startup and/or shutdown of the imaging system). In these verification operations, concurrent operation of the imaging system may not be required. However, it may be desirable to continuously monitor the status of imaging system components during operation of the imaging system, particularly in situations in which vehicle safety may be influenced by the quality of imaging data provided by the imaging system. Imaging systems may be provided having this type of on-the-fly (e.g., real-time) verification capability.

Image sensors may include arrays of image pixels. The pixels in the image sensors may include photosensitive elements such as photodiodes that convert the incoming light into electric charge. Image sensors may have any number of pixels (e.g., hundreds or thousands or more). A typical image sensor may, for example, have hundreds, thousands, or millions of pixels (e.g., megapixels). An image sensor may include verification circuitry for verifying the correct operation of the image sensor. For example, in situations in which images captured by the image sensors are used as input to an active control system for a vehicle, verification circuitry in the image sensor may be configured to generate verification image data and compare the verification image data with an expected result so that incorrect image sensor data is not input into the active control system.

Verification image data may be compared with a predetermined standard stored in the imaging system or stored on additional circuitry that is external to the imaging system. The predetermined standard may be a mathematically determined threshold, may sometimes be referred to as a "golden" standard image, may be captured during manufacturing of the imaging system or at another suitable time (e.g., during startup or shutdown of the imaging system), and may include one or more mathematically or experimentally determined ranges to which verification image data may be compared.

Based on the result of the comparison of the verification image data with the predetermined standard, an imaging system may be disabled (e.g., if the result is outside the predetermined range), may continue to operate normally (e.g., if the result is within the predetermined range). In some arrangements, the imaging system may remain operation but an indicator may be presented to users to inform the users that the imaging system needs further inspection and/or repair (e.g., the imaging system may present a "check imaging system" indication when the results of verification operations indicate a potential problem in the operation of the imaging system).

Figure 1:
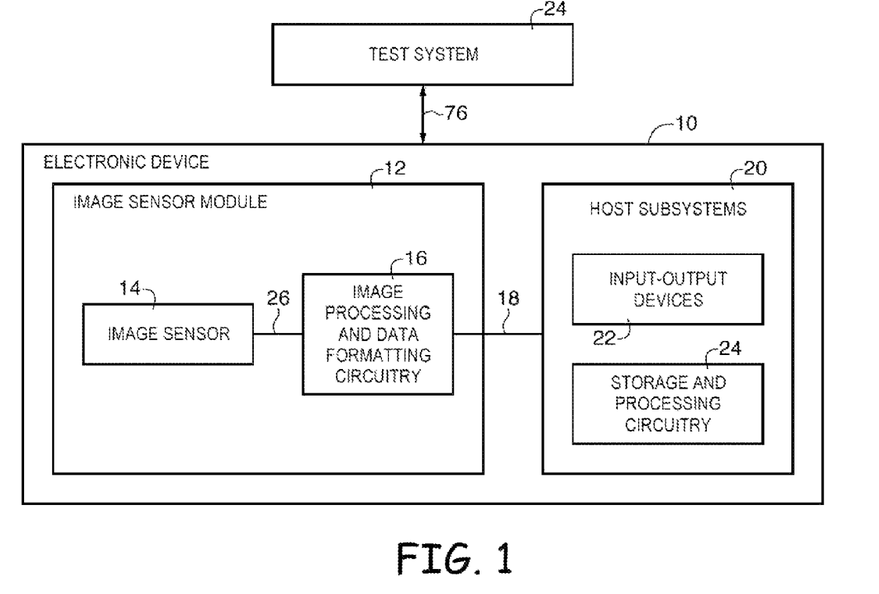
FIG. 1 is an illustrative schematic diagram of an electronic system with an image sensor. The system may include image processing circuitry with error detection capabilities in accordance with an embodiment of the present invention.

Embodiments of the present invention relate to imaging systems with error detection capabilities (e.g., error verification). An electronic device with a digital image sensor module is shown in FIG. 1. Electronic device 10 may be a computer vision system, digital camera, a computer, a cellular telephone, a medical device, or other electronic device. Image sensor module 12 may include image sensor 14 and one or more lenses. During operation, the lenses focus light onto image sensor 14. Image sensor 14 includes photosensitive elements (e.g., pixels) that convert the light into digital data. Image sensors may have any number of pixels (e.g., hundreds, thousands, millions, or more). A typical image sensor may, for example, have millions of pixels (e.g., megapixels). As examples, image sensor 14 may include bias circuitry (e.g., source follower load circuits), sample and hold circuitry, correlated double sampling (CDS) circuitry, amplifier circuitry, analog-to-digital (ADC) converter circuitry, data output circuitry, memory (e.g., buffer circuitry), address circuitry, etc.

Still and video image data from image sensor 14 may be provided to image processing and data formatting circuitry 16 via path 26. Image processing and data formatting circuitry 16 may be used to perform image processing functions such as three-dimensional depth sensing, data formatting, adjusting white balance and exposure, implementing video image stabilization, face detection, etc. Image processing and data formatting circuitry 16 may also be used to compress raw image files if desired (e.g., to Joint Photographic Experts Group or JPEG format). In a typical arrangement, which is sometimes referred to as a system on chip (SOC) arrangement, image sensor 14 and image processing and data formatting circuitry 16 are implemented on a common integrated circuit. The use of a single integrated circuit to implement image sensor 14 and image processing and data formatting circuitry 16 can help to reduce costs.

Image sensor module 12 may convey acquired image data to host subsystems 20 over path 18 (e.g., image processing and data formatting circuitry 16 may convey image data to subsystems 20). Electronic device 10 typically provides a user with numerous high-level functions, or may consist of a computer vision system, for example one used in a vehicle to detect the presence of pedestrians. To implement these functions, host subsystem 20 of electronic device 10 may include storage and processing circuitry 24 and input-output devices 22 such as keypads, input-output ports, joysticks, and displays. Storage and processing circuitry 24 may include volatile and nonvolatile memory (e.g., random-access memory, flash memory, hard drives, solid state drives, etc.). Storage and processing circuitry 24 may also include microprocessors, microcontrollers, digital signal processors, application specific integrated circuits, or other processing circuits.

If desired, imager 12 may be tested using test system 24. Testing system 24 may include processing circuitry and may include test structures for providing a controlled environment for testing imager 14. For example, test system 24 may present test scenes for imager 14 to capture during calibration operations, or may perform the testing by capturing images presented to the sensor during its normal operation. As such, test system 24 may represent a set of circuits and software which is part of the final product's usage model, allowing calibration information to be collected in the field, and also allowing the image output to be evaluated during operation (e.g., test system 24 may be integrated with device 10). Test system 24 may, during calibration operations, be coupled to device 10 via paths 26 (e.g., one or more cables) and communicate with imager 14 and imager processing circuitry 16 (e.g., via input-output devices 22 of device 10). These examples are merely illustrative.

Figure 2:
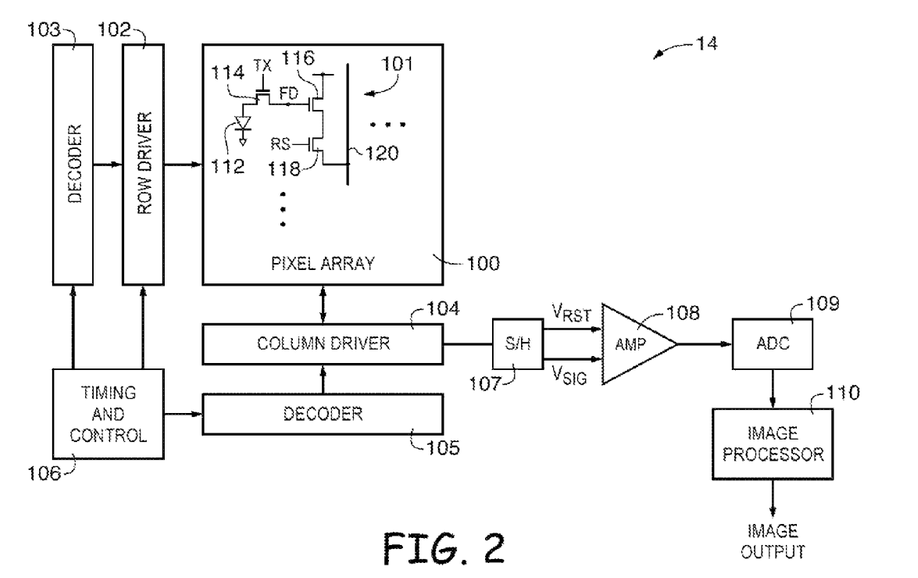
FIG. 2 is a block diagram of an imaging system with error detection capabilities in accordance with an embodiment of the present invention.

FIG. 2 illustrates a simplified block diagram of an imager 14 with improved error detection capabilities, for example a CMOS imager, employing a pixel array 100. Pixel array 100 includes a plurality of pixels 101 arranged in a predetermined number of columns and rows. The row lines are selectively activated by the row driver 102 in response to row address decoder 103 and the column select lines are selectively activated by the column driver 104 in response to column address decoder 105. Thus, a row and column address is provided for each pixel.

Each pixel 101 may include a photodiode 112 (e.g., a photosensitive region), transfer gate 114, source-follower transistor 116, and row select transistor 118. Transfer gate 114 may be controlled by control signal TX to pass accumulated charge from photodiode 112 to a floating diffusion region FD that is connected to the gate of source-follower transistor 116. Pixel signals may be produced on column path 120 by controlling row select transistor 118 with row select signal RS. Row control signals such as TX and RS may be provided to pixels of each row by row driver 102.

Imager 14 is operated by a timing and control circuit 106, which controls decoders 103 and 105 for selecting the appropriate row and column lines for pixel readout, and row and column driver circuitry 102, 104, which apply driving voltages to the drive transistors of the selected row and column lines. The pixel signals, which typically include a pixel reset signal Vrst and a pixel image signal Vsig for each pixel (or each photosensitive region of each pixel) are sampled by sample and hold circuitry 107 associated with the column driver 104. During a correlated double sampling operation, a differential signal Vrst−Vsig is produced for each pixel (or each photosensitive area of each pixel), which is amplified by an amplifier 108 and digitized by analog-to-digital converter 109. The differential signal Vrst−Vsig may sometimes be referred to as a correlated double sampling (CDS) pixel output signal. The analog to digital converter 109 converts the analog pixel signals to digital signals, which are fed to an image processor 110 which forms a digital image. Image processor 110 may, for example, be provided as part of image processing and data formatting circuitry 16 of FIG. 1.

Pixels 101 of pixel array 100 can be subject to operational noise such as burst noise. For example, random telegraph signal (RTS) noise associated with transistors of the pixels may lead to random steps in voltage or current of signals produced by the transistors. RTS noise or other burst noise may be generated due to manufacturing variations such as charge traps between transistor layers in a transistor such as the source-follower transistors of the pixels. As an example, impurities in a gate oxide layer between the polysilicon gate layer of a source-follower transistor and the underlying channel in a semiconductor substrate may serve as charge traps in which charge may sometimes accumulate and contribute to the pixel output signal produced by that source-follower transistor (e.g., in addition to accumulated charge stored in the floating diffusion region from the photodiode of the pixel).

Figure 3:
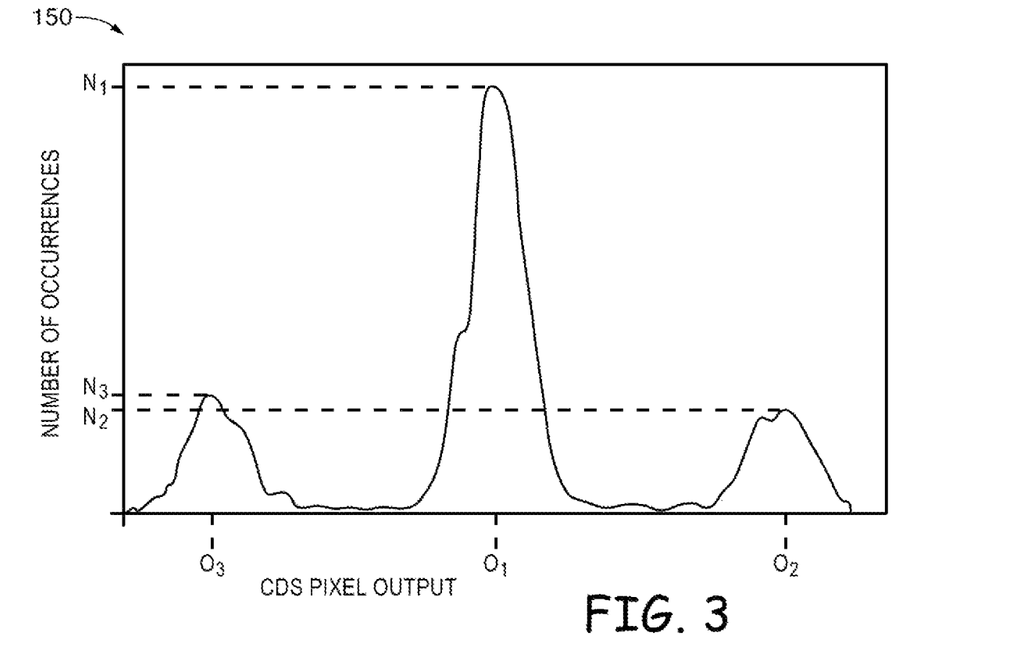
FIG. 3 is a histogram of pixel values illustrating how a pixel characterized by burst noise may exhibit a tri-modal distribution of values over time in accordance with an embodiment of the present invention.

Over time, a pixel that is characterized by RTS noise may produce pixel signals that fluctuate between different voltage levels. For example, a pixel image signal Vsig may fluctuate between first and second voltage levels based on whether or not charge has been trapped. Similarly, a pixel reset signal Vrst may also fluctuate between voltage levels. Pixels that are characterized by burst noise such as RTS noise may be sometimes referred to herein as RTS pixels. FIG. 3 is an illustrative histogram 150 showing how CDS pixel values produced from an RTS pixel may vary over time. The CDS pixel values are computed by sampling signal Vrst, sampling signal Vsig, and computing differential signal Vsig−Vrst (or Vrst−Vsig). In the example of FIG. 3, pixel values may be captured for a constant image scene and computed CDS pixel values are stored in histogram 150 over multiple frames (e.g., hundreds of frames).

As shown in FIG. 3, CDS pixel output values for the RTS pixel exhibit a tri-modal distribution around three center values O1, O2, and O3. In other words, a majority of the CDS pixel output values over time fall within ranges centered at O1, O2, and O3. The range of CDS pixel output values around center value O1 may correspond to scenarios in which pixel signals Vsig and Vrst are each captured with or without RTS noise. In these scenarios, the RTS noise may be canceled by the CDS operations. The number of occurrences in histogram 150 of CDS pixel values computed at value O1 may be N1.

In transistors, such as NMOS transistors, used in image sensor pixels, a trapped charge caused by an electron effectively reduces the gate-source voltage, thereby reducing the current through the device, and producing an unexpectedly lower voltage at the output of the amplifier. In scenarios in which the net signal from the pixel is produced through double-sampling, (e.g., Vnet=Vreset−Vsig), and because an event causing burst noise can occur during either the Vreset sampling phase, the Vsig sampling phase, or during neither phase, the effect is to produce a tri-modal distribution. The distance between peaks is determined by the mean amplitude of the voltage impact of the RTS noise. Different amplitudes of RTS noise are possible during different sampling periods due to the possibility that charges may be trapped in different areas, at different depths within the transistor, causing a spreading of the RTS peaks. Additionally, noise inherent in the system produces spreading of such peaks, as can be seen in the center peak, which represents the absence of RTS noise. The tri-modal characteristics of RTS pixels may reduce imaging performance by introducing noise into CDS pixel output values. However, pixels that have been identified to be RTS pixels can be used to help verify normal operation of an imager, because the tri-modal characteristics are independent of the image scene that is captured by the imager. Image processing circuitry such as circuitry 16 of FIG. 1 may maintain a histogram such as histogram 162 of FIG. 4 for maintaining normal operation of an imager 14.

Figure 4:
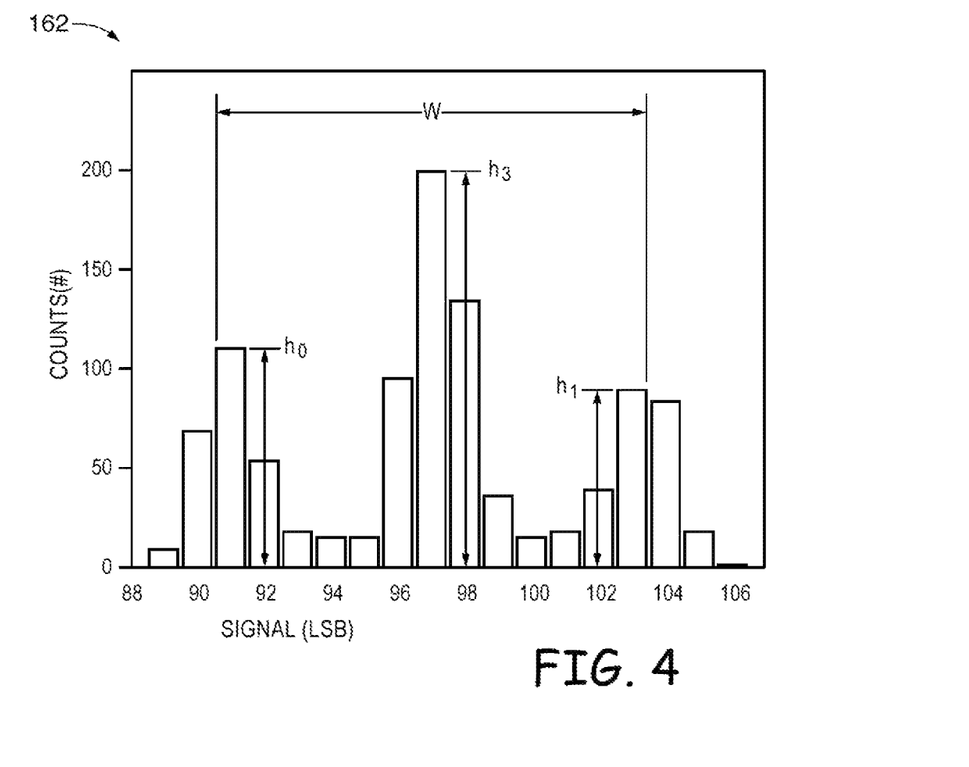
FIG. 4 is a histogram of pixel values that may be maintained by image processing circuitry for error detection in accordance with an embodiment of the present invention.

As shown in FIG. 4, the image processing circuitry may monitor how many times each CDS pixel signal value is produced by imager 14. The image processing circuitry may maintain a sliding window over time for the CDS pixel signal values (e.g., maintaining only CDS pixel signal values received within a window of time extending prior to the current time). In the example of FIG. 4, only a set of least significant bits of the CDS pixel signal values are stored, which helps to reduce the size of histogram 162 while still being capable of identifying RTS noise (e.g., variance in CDS pixel signal values due to RTS noise may be captured by a set of one or more least significant bits of the CDS pixel signal values). The image processing circuitry may use histogram 162 in detecting operational errors of imager 14. For example, the image processing circuitry may detect whether histogram 162 is characterized by a tri-modal distribution having three peaks (e.g., h1, h2, and h3). Additional information such as width W between edge peaks in the histogram may also compared between expected values. The expected values may, for example, be determined via calibration operations and stored at the image processing circuitry.

Figure 5:
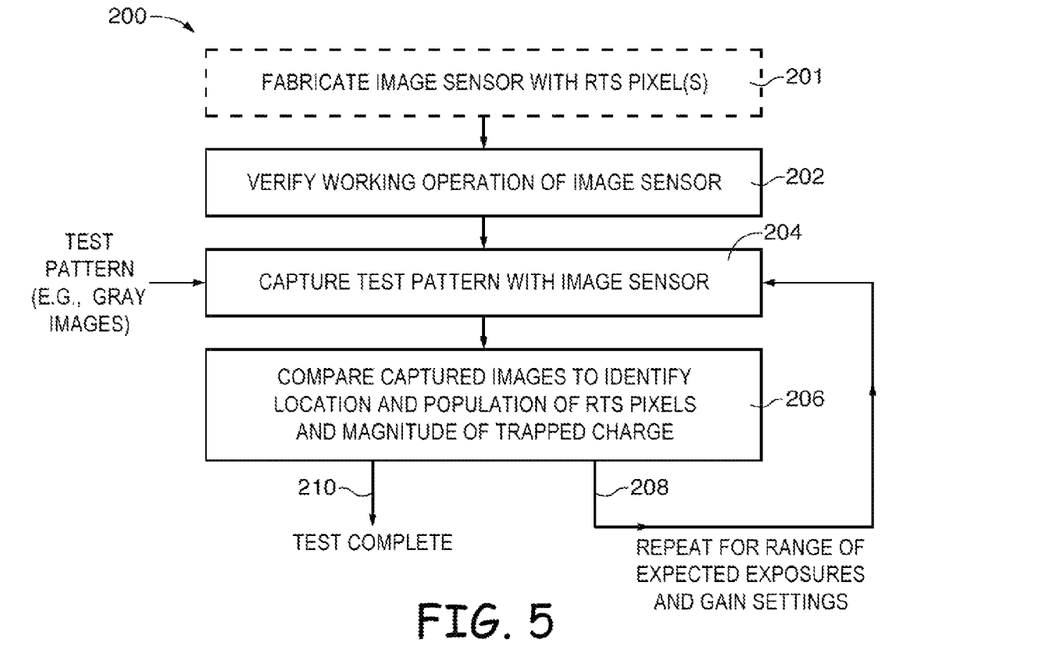
FIG. 5 is a flow chart of illustrative steps that may be performed in identifying a subset of a pixel array having burst noise characteristics in accordance with an embodiment of the present invention.

FIG. 5 is a flow chart 200 of illustrative steps that may be performed in calibrating image processing circuitry for detecting imaging errors using RTS pixels of an image sensor. The steps of flow chart 200 may, for example, be performed using testing circuitry 24 and/or image processing circuitry 16 of FIG. 1.

During optional step 201, an image sensor may be intentionally fabricated with one or more RTS pixels (e.g., instead of merely relying on manufacturing variations to produce RTS pixels). RTS pixels may be intentionally fabricated by introducing impurities into the gate oxide layer that separates a polysilicon gate of source-follower transistors from a semiconductor substrate. Impurities that may be introduced include sodium, heavy metals, or hydrogen. If desired, RTS pixels may be fabricated by eliminating noise optimization steps in the fabrication processes (e.g., fabrication steps of the gate oxide layer may not be optimized for noise and a buried channel may be omitted for the RTS pixels, whereas the gate oxide layer may be optimized for noise and a buried channel may be included for normal pixels).

During step 202, working operation of the image sensor may be verified (e.g., at boot-up or a first installation). If desired, the test system may provide a series of test images (i.e., a test pattern) to the image sensor and compare the captured test images to the original test images in determining whether the image sensor is operating correctly.

During step 204, a gray test pattern including a sequence of gray test images may be provided to the image sensor (e.g., each test image may be entirely solid gray in color).

The gray test pattern may help to ensure that RTS noise does not exceed a pixel value ceiling or fall below a pixel value floor (e.g., because gray color values fall between pixel values of zero and maximum pixel values). The image sensor may capture the sequence of gray test images and provide a sequence of captured images to the image processor.

During step 206, the image processor may compare the captured images to identify RTS pixels. As an example, for each pixel, the image processor may determine whether that pixels "flickers" (e.g., whether the captured pixel value from that pixel varies across multiple distinct voltage levels over time due to burst noise). Each flickering pixel may be identified as an RTS pixel or burst noise pixel. The image processor may identify and store additional information such as where the RTS pixel is located (e.g., which row and column of the pixel array) and the magnitude of the burst noise variation in the voltage levels produced by the RTS pixel (e.g., which reflects how much charge can be trapped by impurities in the RTS pixel structure).

If desired, steps 204 and 206 may be repeated (path 208) to identify RTS pixels across a range of exposures and gain settings that are expected to be used during normal image capture operations. For example, different pixels may exhibit burst noise characteristics for different exposure and gain settings. In this scenario, a respective set of pixels may be identified as RTS pixels for each set of exposure and gain settings (e.g., each time steps 204 and 206 are performed). The sets of RTS pixels along with information identifying the corresponding exposure and gain settings may be stored at the image processing circuitry as a table or database. When all sets of RTS pixels have been identified, calibration operations may be complete (path 210).

Figure 6:
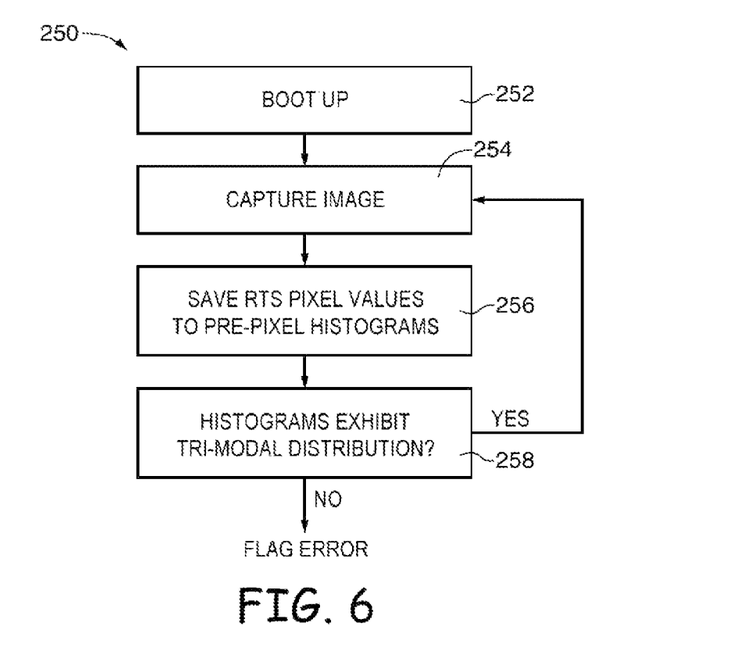
FIG. 6 is a flow chart of illustrative steps that may be performed in detecting imaging system errors based on maintained histogram information in accordance with an embodiment of the present invention.

FIG. 6 is a flow chart 250 of illustrative steps that may be performed by an imager in detecting operational errors using identified RTS pixels. During step 252, the imager may boot up. During subsequent step 254, the imager may be operated to capture an image of a scene. In capturing the image, the imager may produce pixel output values such as CDS pixel output values. The pixel output values may be processed and stored as a captured image by image processing circuitry. During step 256, the image processing circuitry may save the pixel output values from the RTS pixels by updating per-pixel histograms that are maintained by the image processing circuitry for respective RTS pixels (e.g., one histogram per RTS pixel). During step 258, the image processing circuit may determine whether the histograms exhibit tri-modal distribution. For example, the image processing circuit may process the histograms to identify three peaks around which the pixel output values are centered. If desired, the image processing circuit may use additional information such as width W and the magnitude of trapped charge determined during calibration steps (e.g., during step 206 of FIG. 5) in determining whether the characteristics of a maintained histogram matches expected values. In response to determining that each maintained histogram exhibits an expected tri-modal distribution, the operations may return to step 254 to capture additional images (e.g., operate normally).

In response to determining that one or more maintained histograms do not match the expected tri-modal distribution, an error may be flagged. In other words, if a known RTS pixel ceases to exhibit RTS behavior, then image sensor may not be operating correctly. Errors in which captured images are spatially shifted (e.g., horizontally or vertically displaced due to pixel addressing failures) may sometimes be referred to as spatial errors and may be detected. For example, column and/or row decoder and driver circuitry may have malfunctioned and caused a shift in the addressing of rows and/or columns. In this scenario, attempts to address the RTS pixel may incorrectly address a different pixel, because providing the address of the RTS pixel to the decoder circuitry may produce incorrect row and column control signals that access a different pixel in the array. Temporal errors such as when the imager repeatedly provides the same captured image to the image processing circuitry may also be detected, because pixel values corresponding to the location of the RTS pixel may no longer exhibit the expected tri-modal distribution. An imager may repeatedly provide the same captured image to the image processing circuitry due to software errors or due to hardware errors such as a frame buffer failure. In response to detecting an error, the system may take action to mitigate the safety impact, such as warning the user, relying on other sensors for road information, or disengaging a system like adaptive cruise control.

Figure 7:
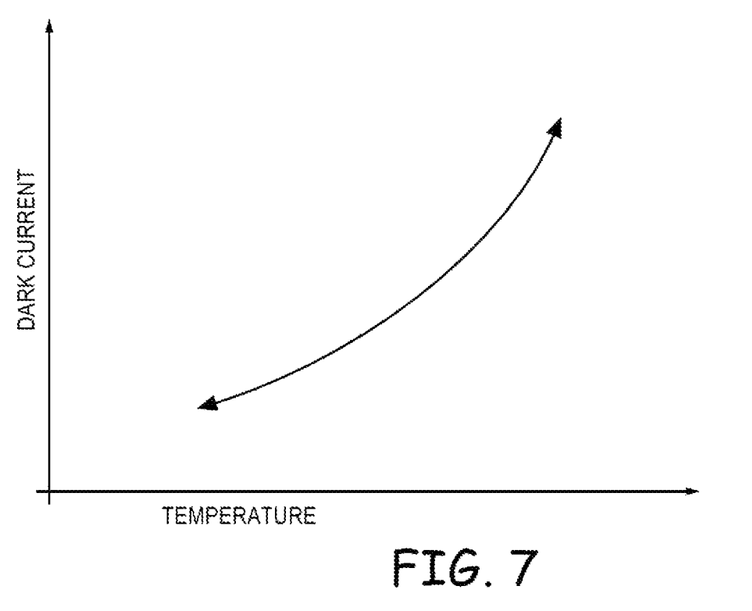
FIG. 7 is a diagram illustrating how photodiode dark current may vary over operating temperature in accordance with an embodiment of the present invention.

If desired, spatial and/or temporal imaging errors may be detected using known dark current characteristics of pixel photodiodes. The dark current of a photodiode may be caused by current leakage (e.g., through the PN junction of the photodiode) and may be dependent on operating temperature as shown in FIG. 7. Increased temperature results in increased dark current, whereas reduced temperature causes less leakage through the photodiode. Dark current can cause accumulated charge to leak through the photodiode (e.g., to the substrate in which the photodiode is fabricated) and the magnitude of voltage change due to the dark current may be dependent on the exposure length for capturing an image. For example, charge accumulated over exposure time T may leak due to dark current at a rate dependent on operating temperature. The total charge leakage may be equal to the rate of current leakage multiplied by exposure time T.

Figure 8:
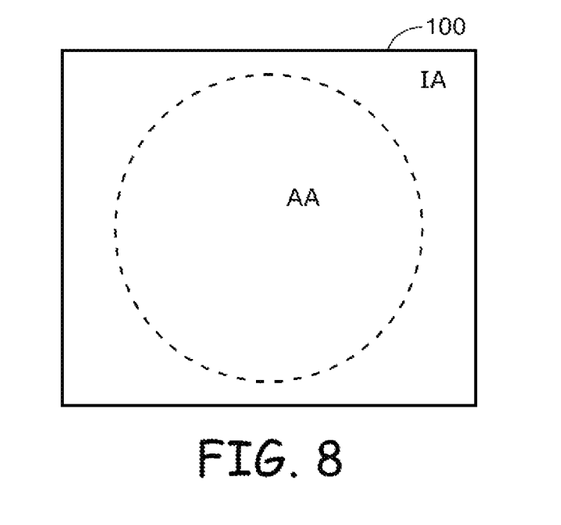
FIG. 8 is a diagram illustrating how a pixel array may include inactive and active regions in accordance with an embodiment of the present invention.

Pixel arrays may include inactive and active regions. As shown in FIG. 8, pixel array 100 may include an active region AA that receives light from an imaging lens. Image signals from pixels in active region AA are used to generate valid captured images, whereas image signals from pixels in inactive region IA are not used in generating valid captured images for a user. In some scenarios, pixels in inactive region IA may be used to detect pixel characteristics such as dark current. The example of FIG. 8 in which active region AA is circular is merely illustrative. Active region AA may have any desired shape (e.g., rectangular) for generating valid captured images for a user.

Figure 9:
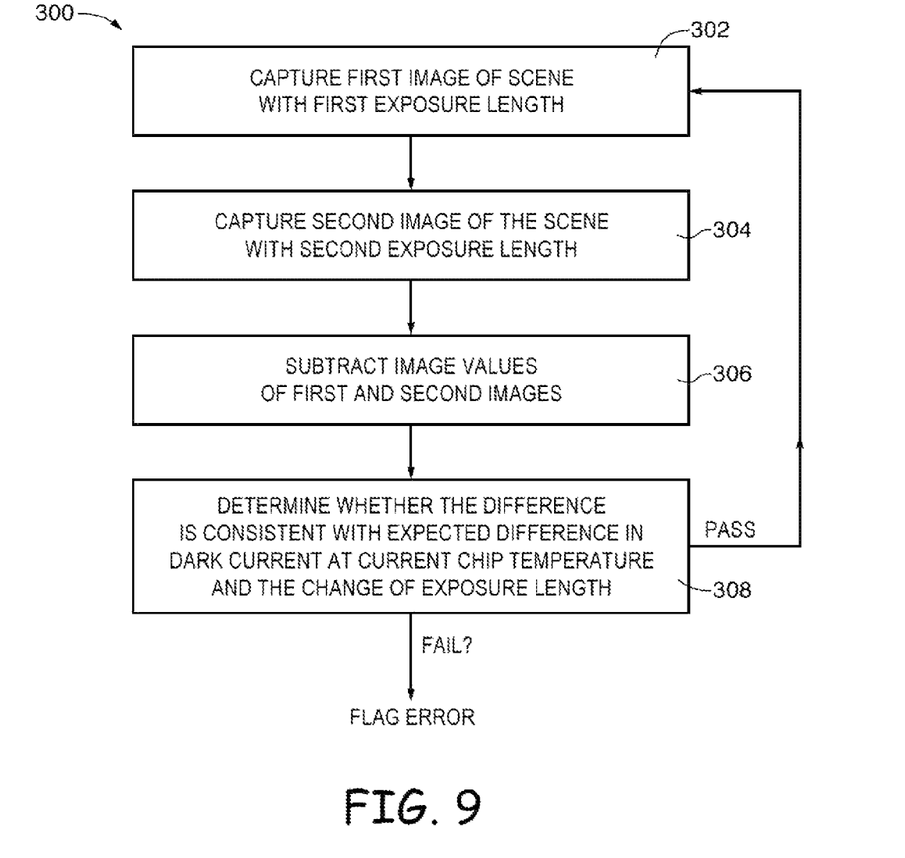
FIG. 9 is a flow chart of illustrative steps that may be performed in using differences in expected dark current between exposure settings to detect imaging errors in accordance with an embodiment of the present invention.

FIG. 9 is a flow chart 300 of illustrative steps that may be performed in using photodiode dark current characteristics to identify imaging errors. The steps of flow chart 300 may be performed using image processing circuitry such as image processing circuitry 16 of FIG. 1.

During step 302, the image processing circuitry may control an image sensor to capture a first image of a desired scene using a first exposure length. During subsequent step 304, the image processing circuitry may control the image sensor to capture a second image of the same desired scene using a second exposure length that is different from the first exposure length. The second exposure length may be shorter or longer in time than the first exposure length. As an example, the image processing circuitry may use only one or more pixels in an inactive region of the pixel array in performing the steps of flow chart 300 (e.g., the desired scene may be constant and dark, because the imaging lens may not focus any substantial amount of light on the pixels of the inactive region). In this scenario, the steps of flow chart 300 may be performed separately or concurrently with normal image capture using an active region of the pixel array.

During step 306, the image processing circuitry may subtract the pixel values of the first and second captured images. For example, the pixel at each location of the first captured image may be subtracted from the pixel at each location of the second captured image. As another example, the pixel at only one or more locations of the second captured image may be subtracted from the pixels at the corresponding locations of the first captured image. During subsequent step 308, the image processing circuitry may determine whether the computed difference values are consistent with expected difference values. The expected difference values may, for example, be calculated by the image processing circuitry based on information from a temperature sensor at the image sensor and based on the exposure lengths. As another example, the expected differences in pixel values may be stored in a table at the image processing circuitry. In this scenario, the image processing circuitry may compare the computed difference values to corresponding entries of the table.

In response to determining that the computed difference in pixel values matches expected results, the image sensor may pass testing and return to step 302 to capture additional images. In response to determining that the computed difference in pixel values does not match the expected results, the image sensor may fail testing and the image processing circuitry may flag an error (e.g., similarly to FIG. 6).

Figure 10:
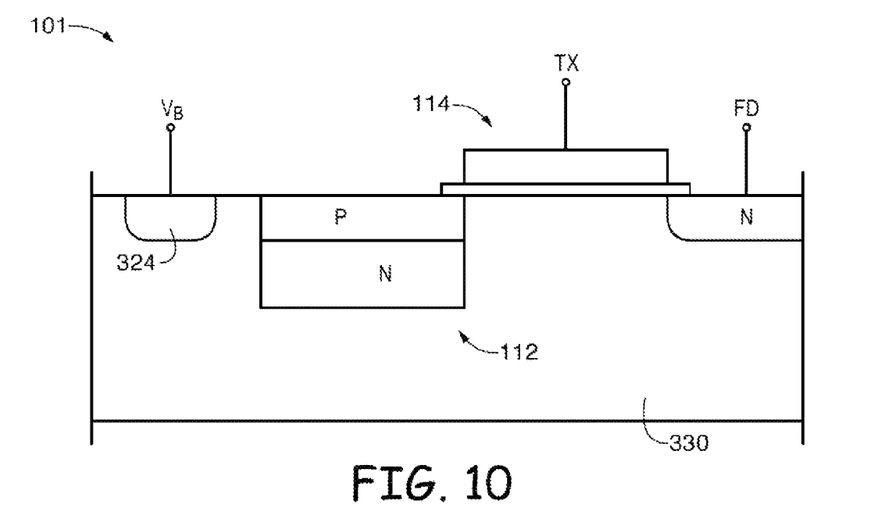
FIG. 10 is a cross-sectional side view of a portion of an illustrative pixel having increased dark current for error detection in accordance with an embodiment of the present invention.

If desired, one or more pixels of a pixel array may be fabricated to provide increased dark current to facilitate the steps of flow chart 300 as shown in the FIG. 10 cross-sectional side view of a pixel 101. Increased dark current levels across all operating temperatures may help increase the magnitude of differences between image values of different exposure lengths, thereby reducing the difficulty of measuring and calculating the differences. Pixel 101 may be fabricated to provide increased dark current by increasing the area of the PN junction of photodiode 112 (e.g., the area of overlap between P-type region 326 and N-type region 328), introducing metal impurities into semiconductor substrate 330 in which the pixel is fabricated, and/or negatively biasing the region of the substrate in which the pixel is fabricated (e.g., by providing a negative voltage VB at body contact region 324).

Figure 11:
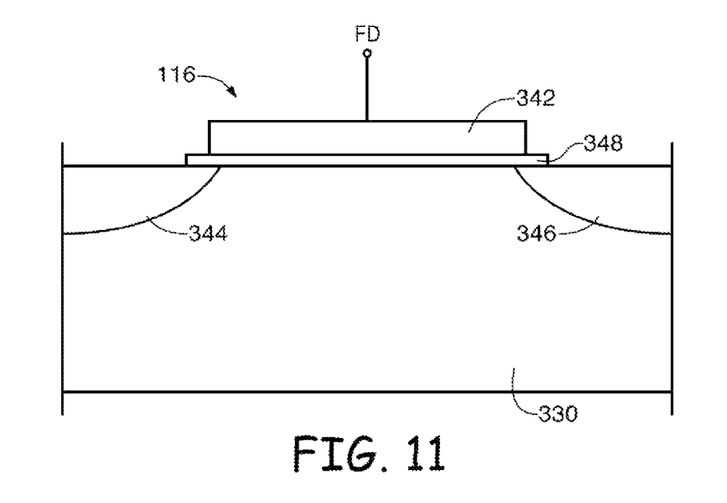
FIG. 11 is a cross-sectional side view of a portion of an illustrative source-follower transistor with increased burst noise characteristics for error detection in accordance with an embodiment of the present invention.

FIG. 11 is a cross-sectional side view of an illustrative source-follower transistor 116 that may be fabricated with burst noise characteristics (e.g., for an RTS pixel such as used during the error detection operations of FIG. 6). As shown in FIG. 11, source-follower transistor 116 may include a gate terminal formed from layer 342 (e.g., poly-silicon). Gate layer 342 may be deposited over gate oxide layer 348, which is deposited over substrate 330 (e.g., over a channel region between source/drain terminals 344 and 346). Gate oxide layer 348 may be doped with impurities such as sodium, heavy metals, or hydrogen species to introduce charge traps, thereby providing transistor 116 with burst noise characteristics.

Figure 12:
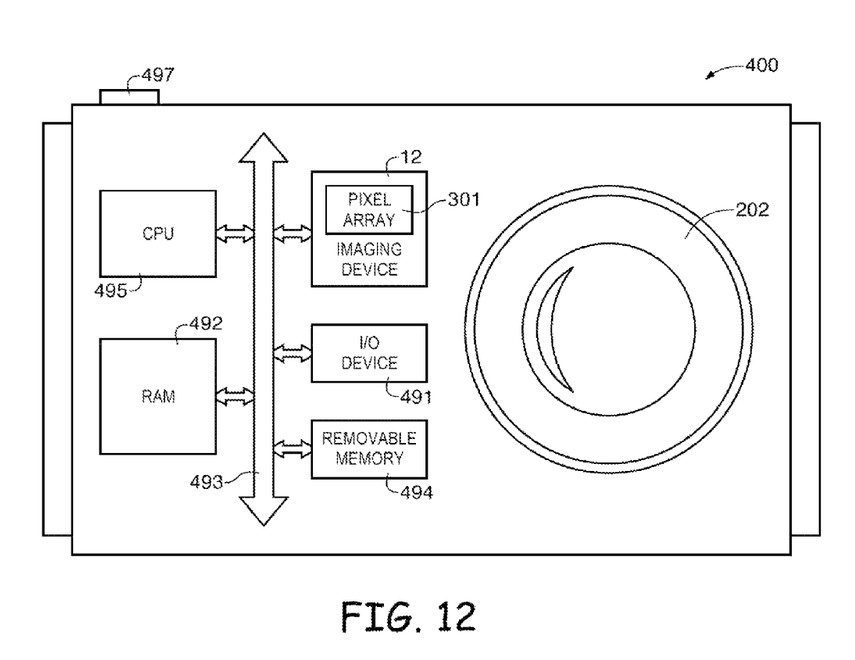
FIG. 12 is a block diagram of a processor system employing the imager of FIG. 2 in accordance with an embodiment of the present invention.

FIG. 12 is a simplified diagram of an illustrative processor system 400, such as a digital camera, which includes an imaging device 12 (e.g., the image sensor module of FIG. 1) employing an imager and improved error detection capabilities as described above. The processor system 400 is exemplary of a system having digital circuits that could include imaging device 12. Without being limiting, such a system could include a computer system, still or video camera system, scanner, machine vision system, vehicle navigation system, video phone, surveillance system, auto focus system, star tracker system, motion detection system, image stabilization system, and other systems employing an imaging device.

Processor system 400, for example a digital still or video camera system, generally includes a lens 202 for focusing an image on pixel array 301 when a shutter release button 497 is pressed, central processing unit (CPU) 495, such as a microprocessor which controls camera and one or more image flow functions, which communicates with one or more input/output (I/O) devices 491 over a bus 493. Imaging device 12 also communicates with CPU 495 over bus 493. System 400 also includes random access memory (RAM) 492 and can optionally include removable memory 494, such as flash memory, which also communicates with CPU 495 over the bus 493. Imaging device 12 may be combined with the CPU, with or without memory storage on a single integrated circuit or on a different chip. Although bus 493 is illustrated as a single bus, it may be one or more busses, bridges or other communication paths used to interconnect system components of system 400.

Various embodiments have been described illustrating imagers with error detection capabilities. Image processing circuitry may be used to detect imaging errors of a pixel array, including imaging errors that would otherwise be difficult to detect visually (e.g., by a user). The image processing circuitry may identify a subset of the pixels that are characterized by burst noise such as RTS noise. The image processing circuitry may monitor the identified subset of the pixels to detect imaging errors. The circuitry may maintain a histogram of image values for a given pixel of the subset of pixels from previously captured images. If desired, a respective histogram may be maintained for each pixel of the identified subset. The pixel array may be used to capture an image. The image processing circuitry may update the histogram(s) using the captured image and determine whether the updated histogram has a tri-modal distribution. In response to determining that the updated histogram does not have a tri-modal distribution of values, the circuitry may identify that an imaging error has occurred. In response to determining that the updated histogram does have a tri-modal distribution of values, the circuitry may continue normal operation such as capturing additional images with the pixel array.

The image processing circuitry may determine which pixels are characterized by burst noise by capturing a sequence of test images with the pixel array and comparing the captured test images. The sequence of test images may be a sequence of gray test images. Each pixel may be characterized as having burst noise if the captured pixel values for that pixel across the test images have a tri-modal distribution of values.

If desired, imaging errors may be detected using expected differences in dark current (e.g., in addition to or instead of using tri-modal histograms). The pixel array may capture a first image of a given scene using a first exposure length and a second image of the given scene using a second exposure length. To detect the imaging errors, the image processing circuitry may determine whether differences in the first and second captured images match expected differences based on changes in dark current due to the different exposure lengths.

The foregoing is merely illustrative of the principles of this invention and various modifications can be made by those skilled in the art without departing from the scope and spirit of the invention.

What is claimed is:

1. A method of using image processing circuitry to detect imaging errors of a pixel array having a plurality of pixels, the method comprising:
with the image processing circuitry, identifying a subset of the pixels of the pixel array that are characterized by noise; and
monitoring the identified subset of the pixels to detect imaging errors, wherein monitoring the identified subset of the pixels comprises maintaining a histogram of captured image values for a single given pixel of the subset of the pixels based on previously captured images, and wherein maintaining the histogram of captured image values comprises maintaining a count of a number of occurrences of each of the captured image values.

2. The method defined in claim 1 wherein monitoring the identified subset of the pixels to detect imaging errors further comprises:
capturing an image using the pixel array;
updating the histogram for the given pixel using the captured image; and
determining whether the updated histogram has a tri-modal distribution.

3. The method defined in claim 2 wherein monitoring the identified subset of the pixels to detect imaging errors further comprises:
in response to determining that the updated histogram does not have a tri-modal distribution, identifying that an imaging error has occurred.

4. The method defined in claim 2 wherein monitoring the identified subset of the pixels to detect imaging errors further comprises:
in response to determining that the updated histogram has a tri-modal distribution, capturing additional images with the pixel array.

5. The method defined in claim 3 wherein identifying the subset of the pixels that are characterized by noise comprises:
capturing a sequence of test images with the pixel array; and
comparing the captured test images to identify the subset of the pixels that are characterized by noise.

6. The method defined in claim 5 wherein capturing the sequence of test images comprises capturing a sequence of gray test images.

7. The method defined in claim 6 wherein identifying the subset of the pixels that are characterized by noise further comprises:
for each pixel, determining whether pixel values produced by that pixel have a tri-modal distribution across the captured test images and, in response to determining that the pixel values produced by that pixel have the tri-modal distribution across the captured test images, assigning that pixel to the subset of pixels that are characterized by noise.

8. The method defined in claim 7 wherein assigning that pixel to the subset of pixels that are characterized by noise comprises identifying a location of that pixel within the pixel array.

9. The method defined in claim 3 wherein each pixel comprises a photodiode that is coupled to a source-follower transistor by a transfer gate and wherein identifying the subset of the pixels that are characterized by noise comprises:
identifying pixels that have been fabricated with charge traps at the source-follower transistor.

10. The method defined in claim 1 further comprising:
with the pixel array, capturing a first image with a first exposure length;
with the pixel array, capturing a second image with a second exposure length;
calculating differences between captured image values of the first and second captured images;
determining whether the calculated differences are consistent with expected difference values; and
in response to determining that the calculated differences are not consistent with the expected difference values, identifying that an imaging error has occurred.

11. The method defined in claim 1, wherein the histogram of captured image values for a single given pixel is based on pixel reset signals for the single given pixel.

12. A method of detecting imaging errors, the method comprising:
with a pixel array, capturing a first image of a given scene with a first exposure length;
with the pixel array, capturing a second image of the given scene with a second exposure length;
identifying a current operating temperature of the pixel array;
identifying a first expected dark current value for the first exposure length based on the current operating temperature;
identifying a second expected dark current value for the second exposure length based on the current operating temperature;
with image processing circuitry, calculating an expected dark current difference by subtracting the first expected dark current value from the second expected dark current value; and
with the image processing circuitry, determining whether differences in the first and second captured images match the expected dark current difference.

13. The method defined in claim 12 wherein determining whether the differences in the first and second captured images match the expected dark current difference comprises:
with the image processing circuitry, computing the expected differences in the first and second captured images based on the difference in expected dark current between the first exposure length and the second exposure length.

14. The method defined in claim 12 wherein the pixel array comprises an active region and an inactive region, wherein capturing the first image of the given scene with the first exposure length with the pixel array comprises capturing the first image using only pixels of the inactive region, and wherein capturing the second image of the given scene with the second exposure length with the pixel array comprises capturing the second image using only the pixels of the inactive region.

15. A system, comprising:
a central processing unit;
memory;
input-output circuitry; and
an imaging device, wherein the imaging device comprises:
a pixel array;
a lens that focuses an image on the pixel array; and
image processing circuitry that identifies a subset of the pixels of the pixel array that are characterized by noise and monitors the identified subset of the pixels to detect imaging errors, wherein monitoring the identified subset of the pixel to detect imaging errors comprises maintaining a first histogram of pixel values for only a first given pixel of the identified subset and maintaining a second histogram of pixel values for only a second given pixel of the identified subset, and wherein the pixel values comprise captured pixel image signals.

16. The system defined in claim 15 wherein the pixel array comprises:

a semiconductor substrate;

a first plurality of pixels; and a second plurality of pixels that comprises the identified subset of pixels, wherein the second plurality of pixels are different from the first plurality of pixels and wherein each pixel of the second plurality of pixels includes fabricated charge traps.

17. The system defined in claim 16 wherein each pixel of the pixel array comprises:

a photodiode;

a transfer gate that couples the photodiode to a floating diffusion region; and a source-follower transistor having a gate terminal that is coupled to the floating diffusion region, wherein the fabricated charge traps are at the gate terminal.

18. The system defined in claim 17 wherein the source-follower transistor comprises:

an oxide layer deposited on the semiconductor substrate;

source and drain regions in the semiconductor substrate; and a gate layer on the oxide layer, wherein the gate layer is doped with impurities to form the charge traps.

19. The system defined in claim 15 wherein the image processing circuitry detects imaging errors based on whether the histograms of pixel values have tri-modal distributions.

20. The system defined in claim 15 wherein the pixel values comprise correlated double sampling pixel output signals, wherein the correlated double sampling pixel output signals are based on the captured pixel image signals and pixel reset signals.

* * * * *